Oct. 30, 1923.
W. E. BAKER
1,472,423
ANIMAL TRAP
Filed July 5, 1921
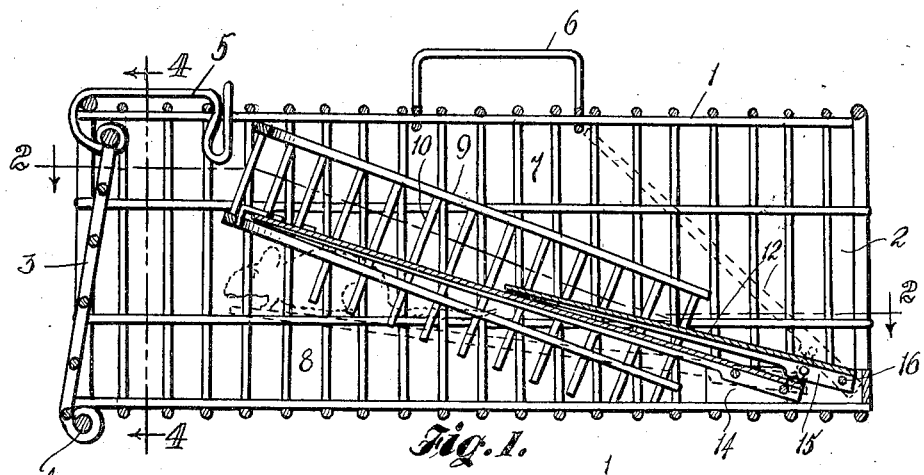
Fig. 1.
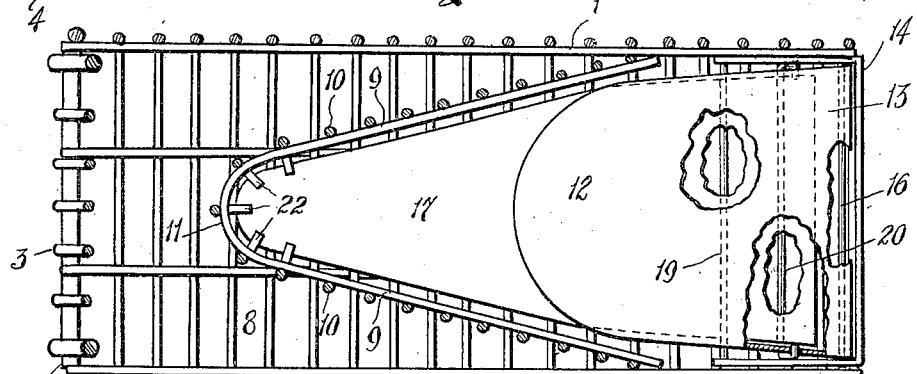
Fig. 2.
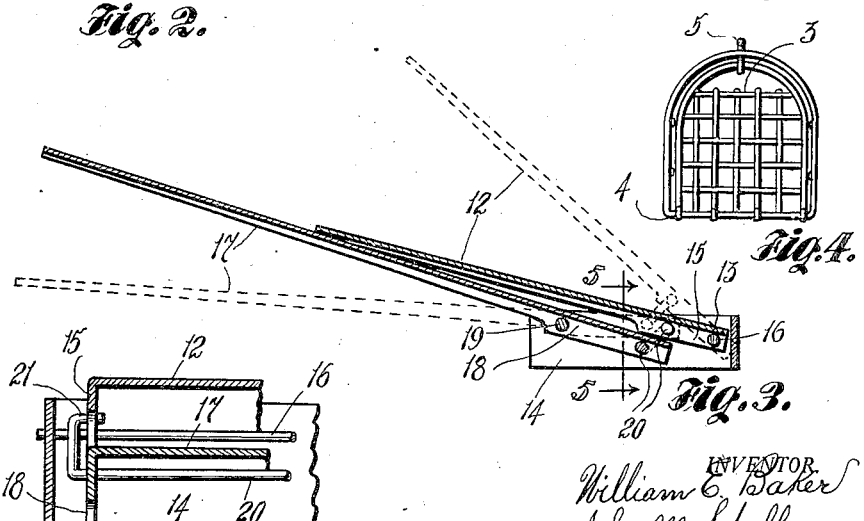
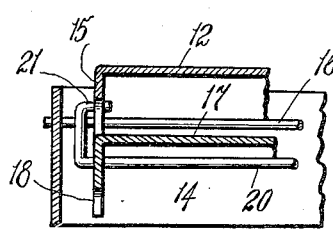
INVENTOR.
William E. Baker
BY John M. Spellman
ATTORNEY.

Patented Oct. 30, 1923.

1,472,423

UNITED STATES PATENT OFFICE.

WILLIAM E. BAKER, OF WACO, TEXAS, ASSIGNOR TO WONDER TRAP CO. INC., OF WACO, TEXAS, A CORPORATION.

ANIMAL TRAP.

Application filed July 5, 1921. Serial No. 482,335.

*To all whom it may concern:*

Be it known that I, WILLIAM E. BAKER, a citizen of the United States, residing at Waco, in the county of McLennan and State of Texas, have invented certain new and useful Improvements in Animal Traps, of which the following is a specification.

This invention relates to improvements in animal traps, particularly for rats, and it further relates to an improvement over that form of trap covered by Letters Patent of the United States, No. 1,206,649, granted to me under date of November 28, 1916.

The principal object of the present invention is to improve the operation of the trap doors by a new pivotal arrangement, said arrangement being such as to provide a more positive and quick operation of the trap doors, and to further provide a larger and more inviting entrance for the animal.

In the former invention referred to above the trap was formed with an upwardly inclined runway upon which the animal passed before reaching the first or outer door and the two trap doors when in normal position assumed a horizontal position. In the present invention this runway is eliminated and by a new arrangement of the pivot rods and links connecting the two doors the outer door is made to extend from the extreme front of the trap opening in an upwardly inclined position to lie upon the inner trap door, likewise inclined, so that both trap doors provide a high inclined entrance. Particular attention is called to the desirability and advantage of a trap of this class with the entire one end utilized as an entrance and with the high inclined entrance platform comprised in the above described doors. Further, both doors are supported upon and pivoted to a plate, the plate resting upon the floor of the cage of the trap, to effect the large entrance.

The invention will be more fully understood by reference to the following description, taken in connection with the accompanying drawing, forming part hereof, in which—

Figure 1 is a longitudinal sectional view through a trap constructed in accordance with the improvements pointed out, the trap doors being shown by full lines in closed position and by dotted lines in open position.

Figure 2 is a horizontal sectional view through the trap on line 2—2 of Figure 1.

Figure 3 is a detail view of the trap door mechanism, the doors being shown in normal position by full lines, the dotted lines indicating the position of the doors when an animal is entering the trap.

Figure 4 is a vertical sectional view through one end of the trap, showing the exit door, and Figure 5 is a cross-sectional view of the trap doors shown in detail in Figure 3, the view being on line 5—5 thereof.

Referring more in detail to the drawings, 1 denotes the body portion of the trap which is in the form of an elongated cage, one end 2 being open and the other end provided with a closure or door 3, the door 3 being hinged to the bottom of the cage as at 4 and provided at its upper end with a suitable hook member 5 adapted to extend over the top of the cage and to be brought into engagement with one of the bars of the cage. The door 3 is normally closed and is opened when removing animals or for other purposes. 6 denotes the cage handle.

The cage is divided into two chambers, an ante-chamber 7 and a main chamber 8, in which latter chamber the animals are held after being captured. The division of the two chambers is procured by means of a wall formed of the upwardly inclined bars 9—9 connected to the obliquely positioned bars 10—10 in connection with the trap doors, referred to hereinafter and more particularly described. The divisional wall as shown in Figure 2 extends entirely across the open end of the cage and is connected to the side walls thereof, beginning a short distance inward from the open end 2 of the cage, is converged inwardly to a rounded end 11, and then fastened to the cage bars.

Referring now more specifically to the mechanism of the trap: a trap door 12 shown in detail in Figure 3, has one end 13 spaced entirely across the open end of the cage and is connected to the side walls of a plate 14 resting upon the bottom of the cage, by means of flanges 15—15 and a pivot rod 16, the rod 16 also pivoted to the plate 14. The trap door 12 is slightly converged inwardly so as to conform to the divisional walls formed by the bars 9 and 10 and when in the position shown by dotted lines fits against the rounded roof of the cage.

A second trap door 17 provided with flanges 18—18 is pivoted by a rod 19 to the plate 14. This door 17 is tapered in width to a rounded point and conforms to the space between the divisional walls. The two trap doors 12 and 17 are pivoted together by a link 20 and so balanced as to remain in the normal position shown by full lines in Figure 3, and by the arrangement of the rods and link are adapted to swing or tilt in opposite directions as shown by dotted lines, Figure 3. It will be noted that the link 20 is formed of a single length of wire, preferably U-shaped, the cross bar of the link being passed through the flanges 18—18 of the door 17, while the arms 21—21 thereof are pivoted in the door 12, the object being to eliminate any frictional contact between the two doors that would scare or disturb the animal in its entrance to the cage. As previously mentioned, it will also be seen that by means of the new and improved arrangement of the pivoted rods, link and the plate 14 a much larger and inviting entrance is provided to attract the animal. Stops 22—22 limit the upward movement of trap door 17.

In operation, the animal enters the antechamber 7, the doors 12 and 17 being in the full line position shown in Figures 1 and 3, and as long as the animal has any part of its weight on the door 12, this door, on account of its arrangement and in connection with the door 17 and the pivoted connection, affords an extra lever power to overcome the weight of the animal upon the door 12, until the last foot of the animal is transferred to door 17. The instant, however, that the entire weight of the animal is put upon door 17, said lever power created by the weight of the animal upon the door 12 and extending past the pivot rod 19, no longer holds the doors together, and consequently the animal is deposited into the main chamber 8, the doors assuming position of the dotted lines. As soon as the animal is off the door 17 both doors assume normal position.

What is claimed as new is—

1. In a trap, a cage having an open end, a plate set on edge and extending across said end of the cage and along the cage sides, an inclined wall extending from in front of said plate upwardly toward the rear and top of the cage, an under trap door pivoted to the sides of said plate at points spaced from the outer end of the trap door, a shorter and upper trap door pivoted at its outer end to the sides of said plate outwardly beyond the pivotal point of the under trap door, and means for operating the two doors including a bar pivoted to and extending across, and beneath the under trap door and having its ends extending upwardly and turned inwardly and pivoted to the upper trap door to normally hold each of said doors at an incline and substantially in the plane of the said inclined wall.

2. In a trap, a cage having an open end, a dividing wall in the cage, an under trap door pivotally connected to the cage, an upper trap door pivotally connected to the cage, and means for operating the two doors including a bar pivoted to and extending across and beneath the under trap door and having its ends extending upwardly and turned inwardly and pivoted to the upper trap door.

3. In a trap, a cage having an open end, an inclined dividing wall in the cage extending from points spaced from the open cage end, an under and an upper trap door each pivotally related to the cage and extending across said space between the wall and the open cage end, and means to operate the doors and being pivotally connected to each and formed to normally hold each of the doors at an incline and in substantially the plane of the inclined dividing wall.

In testimony whereof I have signed my name to this specification.

WILLIAM E. BAKER.